Jan. 3, 1950  B. H. HATHAWAY  2,493,138
TIME TEACHING DEVICE
Filed Nov. 8, 1947

BARBARA H. HATHAWAY,
INVENTOR.

BY *Forrest J. Lilly*

ATTORNEY.

Patented Jan. 3, 1950

2,493,138

UNITED STATES PATENT OFFICE 2,493,138

TIME TEACHING DEVICE

Barbara H. Hathaway, Hollywood, Calif.

Application November 8, 1947, Serial No. 784,824

2 Claims. (Cl. 35—39)

1

The present invention relates to educational devices, and its primary object is to provide a new method and means for teaching children to read time, by combining the educational process with an entertaining pastime, so that the child's interest in the proceedings is stimulated and sustained. In the practice of the invention, the relative positions of the clock hands at each hour of the day are impressed upon the child's mind by means of an easily remembered jingle which refers to subjects or objects illustrated adjacent the hour numerals on the face of a specially designed nursery clock.

The invention makes use of the well-known fact that the average child is entertained by hearing and repeating simple jingles about familiar subjects or objects, of the type known as nursery rhymes, and quickly memorizes them. Accordingly, one of the elements of the invention is a twelve verse jingle, the verses of which describe the activities or experiences of some familiar nursery characters, such as "Jack and Jill," at each hour of the day. Each verse refers to a familiar object or subject, such as a farm animal, plaything, pet, or the like, which is tied in with the hour; and the time of day with which the verse is concerned is keyed, as far as possible, with an activity appropriate to the hour.

The second element of the invention is a nursery clock having illustrations of the several objects or subjects referred to in the verses arranged in a circle concentric with the hour numerals, each illustration being disposed closely adjacent the hour with which it is associated in the verse. The two principal characters of the jingle are depicted on the hands of the clock, and during the recitation of the jingle, the hands may be turned manually to the hour corresponding to the verse. In this way, the child quickly associates the position of the hands with the hour referred to in the corresponding verse, and thus learns to recognize the hour of the day, as indicated by the hands of the nursery clock of the invention. Once the verses have been memorized and the relative positions of the hands for each verse have become fixed in mind, the child is usually able to recognize the relationship between the nursery clock and a conventional clock, and to read the time from the latter with equal facility.

Figure 1:
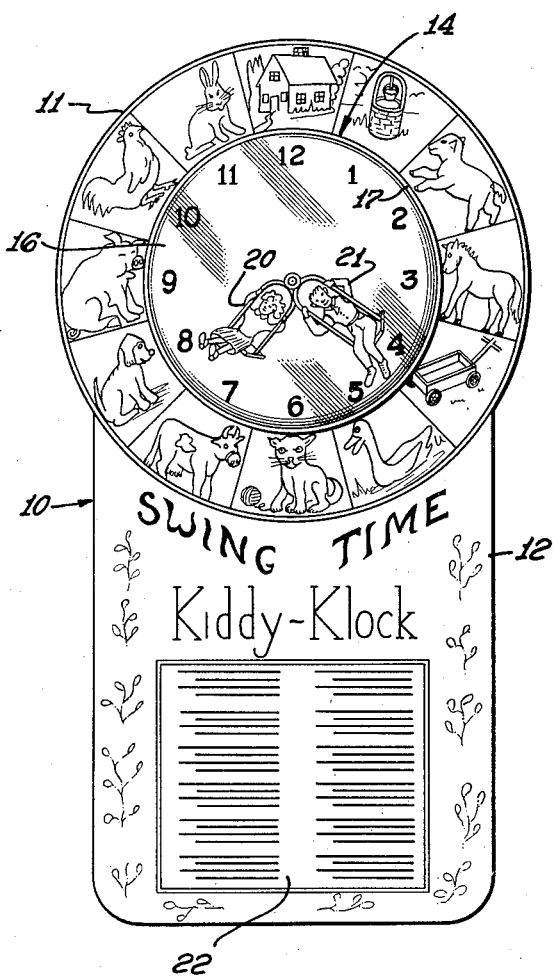
Figure 2:
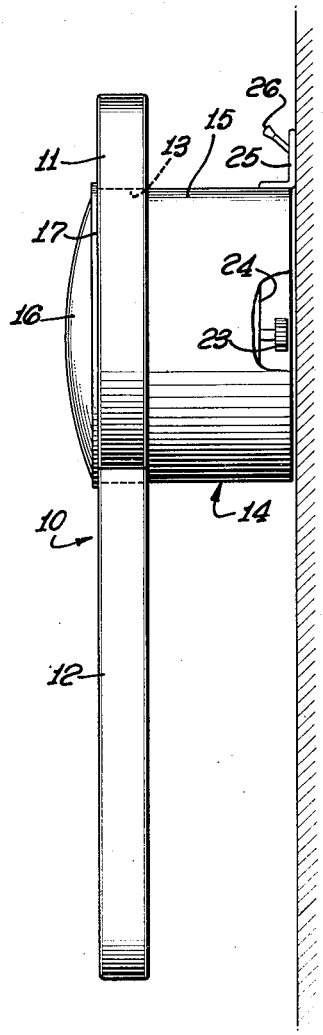

Other objects and advantages of the invention will become apparent upon reading the following detailed description of a preferred embodiment thereof, reference being had to the accompanying drawing, wherein:

Figure 1 is a front elevational view of a nursery clock embodying the principles of the invention; and Figure 2 is a side elevational view of the same.

2

As shown in the drawings, the nursery clock of the invention consists of a flat plaque or panel 10 having a generally circular top portion 11, with a depending rectangular portion 12. A circular opening 13 is provided in the center of the top portion 11 of the plaque, and a clock 14 having a cylindrical case 15 is inserted through the opening until its face 15 is substantially flush with the outer surface of the plaque. The clock 14 is secured to the plaque in any suitable manner with its crystal 16 and retaining rim 17 projecting slightly from the front face thereof.

Disposed around the outer edge of the circular portion 11 of the plaque adjacent the margin of the clock face, are twelve illustrations depicting farm animals, playthings, pets, and the like, which are referred to in the twelve verses of the jingle used with the clock. These illustrations are preferably applied as decalcomanias, although they might also be printed on paper which is then cemented to the plaque, or lithographed directly onto the face of the plaque.

The illustrations may be of any desired subjects familiar to the average child, and the twelve subjects depicted in the drawings are merely illustrative of the general type which have been found most effective. For example, the illustration adjacent the hour numeral "12" on the clock face is that of a home. At one o'clock is a well; at two o'clock is a lamb; at three o'clock is a pony; at four o'clock is a red wagon; at five o'clock is a duck; at six o'clock is a kitten; at seven o'clock is "Bossy, the cow"; at eight o'clock is a dog "Rover"; at nine o'clock is "Porky, the pig"; at ten o'clock is a little red hen; and at eleven o'clock is "Peter Rabbit."

Affixed to the hour hand of the clock is a cut-out 20 of the principal character of the jingle; in this case being "Jill" of the nursery rhyme "Jack and Jill." A cut-out 21 of "Jack" is mounted on the minute hand of the clock. Both Jack and Jill are preferably, although not necessarily, shown as seated in swings, since the illustrative jingle which follows shortly refers to Jill in several places as being engaged in swinging. The cut-outs 20 and 21 may be made of paper or Celluloid which is cemented to the clock's hands, or the hands themselves may be stamped out to the form shown, and lithographed; the principal requirement being that the two cut-outs clear one another when the hands are turned.

In the preferred form of the invention, the twelve verse jingle which goes with the illustration is printed on a card 22 that is suitably affixed to the rectangular lower portion 12 of the plaque. The jingle may, of course, take any desired form. In the following illustrative example, the jingle starts with seven o'clock in the morning, when Jill arises, and ends with dinner at six o'clock in the evening.

A typical jingle might be:

When Jill swings over
    old Bossy, the cow—
It's Seven o'clock—
    and you're up by now!

When Jill waves hello
    to her little dog, Rover—
It's Eight by the clock—
    and breakfast is over!

Porky, the pig, smiles at
    Jill, when it's Nine—
And you're set for play
    if the weather's fine!

By the time Jill meets
    the little red hen—
The morning's half gone—
    and the clock says Ten!

Jill swings high at Eleven—
    and so does the sun.
And there's Peter Rabbit
    to join in the fun!

It's Twelve straight up
    when Jill finally meets Jack—
They've both come home
    for a noon-time snack!

It's One o'clock
    when Jill reaches the well—
Where grass grows green—
    in a cool shady dell!

The frisky white lamb
    runs to see Jill at Two
And that should be just about
    nap-time for you!

Your nap-time is over—
    that's easy to see.
When Jill meets her pony—
    the time is Three!

It's Four when Jill swings by
    Jack's little red wagon—
The sun's starting down—
    and the afternoon's laggin'!

When Jill's by the pond
    where the little ducks dive—
Daddy's on his way—
    'cause the clock's struck Five!

When kitty greets Jill
    with a playful "mew" "mew"—
Six o'clock dinner is
    waiting for you!

As the jingle is recited to the child, the hands of the clock are turned manually by means of the usual stem 23 on the back of the case 15, so that Jill is opposite seven o'clock for the first verse, and progresses around the clock, stopping at each hour while the corresponding verse is being recited.

The cylindrical side walls of the clock case 15 are preferably extended rearwardly behind the back side 24 thereof, so that the clock can be hung on a wall, as shown, without interference from the stem 23. A bracket 25 fixed to the top of the casing at the back edge thereof is adapted to be hung on a nail 26 or other suitable projection on the wall. Thus, when the recitation period is ended, the clock can be set to the correct time and hung on the wall to serve as a nursery time piece.

While I have shown and described an actual clock in the preferred embodiment of the invention, it is not intended that the invention be limited in this respect, since it might also be desirable to use the same principle in a simpler and more inexpensive device utilizing a dummy clock face with hands which can only be turned manually. In a form such as this, the device would, of course, be used only while reciting the jingle, at which time the hands would be turned by the parent or by the child. Various other changes and modifications may be made without departing from the scope of the invention as defined in the appended claims.

I claim:

1. A device for teaching children to read time, said device being adapted for use with a jingle having verses describing the activities and experiences of a principal character during twelve successive hours of the day, each hour being associated with one of twelve subjects or objects familiar to the child, said device comprising a clock face, the character or object associated with each hour in said jingle being illustrated adjacent the corresponding hour numeral, and a pair of manually rotatable clock hands at the center of said clock face, one of said hands corresponding to the hour hand of a clock, and having a representation of said principal character in said jingle reproduced thereon, whereby said one hand can be moved successively from one hour numeral and its respective illustration to the next, during recitation of said jingle, to impress on the mind of the child, in an easily remembered manner, the position of said hand at different hours of the day.

2. A device for teaching children to read time, said device being adapted for use with a jingle having verses describing the activities and experiences of a principal character during twelve successive hours of the day, each hour being associated with one of twelve subjects or objects familiar to the child, said device comprising a plaque, a clock having a case mounted in said plaque, the character or object associated with each hour in said jingle being illustrated on said plaque adjacent the corresponding hour numeral of the clock, the hands of said clock having figures mounted thereon representing said principal characters of the jingle, and means on said clock for rotating said hands manually during recitation of said jingle, whereby the character on the hour hand is brought successively to positions opposite the hour numeral and associated subject referred to in each of said verses.

BARBARA H. HATHAWAY.

REFERENCES CITED

The following references are of record in the file of this patent:

UNITED STATES PATENTS

| Number | Name | Date |
|---|---|---|
| D. 149,106 | Berman | Mar. 30, 1948 |
| 623,558 | Paterson | Apr. 25, 1899 |
| 2,305,283 | Theilkas | Dec. 15, 1948 |